United States Patent
Stager et al.

(10) Patent No.: US 8,903,019 B2
(45) Date of Patent: Dec. 2, 2014

(54) MULTIDIMENSIONAL CHANNEL ESTIMATION WITHOUT SOUNDING SIGNALS

(75) Inventors: Paul J. Stager, Akron, OH (US); Xiantao Sun, Newark, DE (US)

(73) Assignee: Cisco Technology, Inc., San Jose, CA (US)

( * ) Notice: Subject to any disclaimer, the term of this patent is extended or adjusted under 35 U.S.C. 154(b) by 1370 days.

(21) Appl. No.: 12/260,782

(22) Filed: Oct. 29, 2008

(65) Prior Publication Data

US 2010/0104038 A1    Apr. 29, 2010

(51) Int. Cl.
| | | |
|---|---|---|
| H04L 27/00 | (2006.01) | |
| H04L 27/06 | (2006.01) | |
| H04L 25/02 | (2006.01) | |
| H04B 7/04 | (2006.01) | |
| H04B 7/06 | (2006.01) | |
| H04B 7/08 | (2006.01) | |

(52) U.S. Cl.
CPC .......... *H04B 7/0848* (2013.01); *H04L 25/0208* (2013.01); *H04L 25/0238* (2013.01); *H04B 7/043* (2013.01); *H04B 7/0617* (2013.01); *H04B 7/0452* (2013.01)
USPC ............ 375/316; 375/340; 375/342; 375/347

(58) Field of Classification Search
USPC ......... 375/211, 219, 220, 222, 221, 277, 278, 375/284, 285, 316, 339, 344, 345, 346, 295, 375/324, 326, 340, 342, 347, 348, 354, 358, 375/356
See application file for complete search history.

(56) References Cited

U.S. PATENT DOCUMENTS

| | | | |
|---|---|---|---|
| 7,620,423 B2 | 11/2009 | Jin et al. | |
| 7,697,485 B2 | 4/2010 | Liu et al. | |
| 7,825,856 B2 | 11/2010 | Na et al. | |
| 7,966,043 B2 | 6/2011 | Guo et al. | |
| 7,978,784 B2 | 7/2011 | Zhang et al. | |
| 2006/0270343 A1* | 11/2006 | Cha et al. | 455/25 |
| 2007/0060073 A1* | 3/2007 | Boer et al. | 455/101 |
| 2007/0087694 A1 | 4/2007 | Jin et al. | |
| 2007/0104089 A1* | 5/2007 | Mujtaba | 370/209 |
| 2007/0165699 A1* | 7/2007 | Dabak et al. | 375/146 |

(Continued)

OTHER PUBLICATIONS

"Wi-Fi Certified™ 802.11n Draft 2.0: Longer-Range, Faster Throughput, Multimedia-Grade Wi-Fi® Networks", 2007 Wi-Fi Alliance, pp. 1-18.

(Continued)

*Primary Examiner* — Sam K Ahn
*Assistant Examiner* — Linda Wong
(74) *Attorney, Agent, or Firm* — Edell, Shapiro & Finnan, LLC (57) ABSTRACT

Techniques are provided herein to estimate parameters of a wireless communication channel. At each of a first plurality of antennas of a first wireless communication device, a transmission is received that is associated with each of one or more spatial streams transmitted via a second plurality of antennas of a second wireless communication device. The transmission comprises at least first and second training fields which are configured for channel estimation. Multidimensional channel information between the first plurality of antennas and the second plurality of antennas is computed from receive values in the first and second training fields for one more dimension above a number of the spatial streams transmitted by the second wireless communication device and up to a lesser of a number of the first plurality of antennas and a number of the second plurality of antennas.

28 Claims, 6 Drawing Sheets

(56) References Cited

U.S. PATENT DOCUMENTS

| | | | |
|---|---|---|---|
| 2007/0258541 A1* | 11/2007 | Yamaura | 375/267 |
| 2007/0286303 A1 | 12/2007 | Yamaura | |
| 2007/0298742 A1* | 12/2007 | Ketchum et al. | 455/186.1 |
| 2008/0051145 A1 | 2/2008 | Jin | |
| 2008/0075037 A1 | 3/2008 | Guo et al. | |
| 2008/0139248 A1 | 6/2008 | Liu et al. | |
| 2008/0165728 A1 | 7/2008 | Liu et al. | |
| 2008/0205539 A1 | 8/2008 | Wang et al. | |
| 2009/0042618 A1 | 2/2009 | Hedayat et al. | |
| 2009/0098838 A1 | 4/2009 | Guo et al. | |
| 2009/0103497 A1* | 4/2009 | Fernandez-Corbaton et al. | 370/335 |
| 2009/0116569 A1 | 5/2009 | Jin | |
| 2009/0290563 A1* | 11/2009 | Gu et al. | 370/338 |
| 2011/0019775 A1* | 1/2011 | Ruscitto et al. | 375/340 |
| 2011/0051636 A1 | 3/2011 | Van Nee et al. | |
| 2011/0201282 A1 | 8/2011 | Van Nee et al. | |
| 2011/0268215 A1 | 11/2011 | Khojastepour | |
| 2012/0328033 A1 | 12/2012 | Jin et al. | |
| 2013/0128935 A1 | 5/2013 | Janani et al. | |

OTHER PUBLICATIONS 802.11n: The Standard Revealed, 2009 Cisco Systems Inc., pp. 1-23.

* cited by examiner

MULTIDIMENSIONAL CHANNEL ESTIMATION WITHOUT SOUNDING SIGNALS

TECHNICAL FIELD

The present disclosure relates to wireless communication technology and particularly to multiple-input multiple-output (MIMO) wireless communication systems.

BACKGROUND

MIMO wireless communication systems comprise multiple-antenna wireless communication devices on both ends of a communication link, e.g., at an access point (AP) and a client station (CS). MIMO wireless communication techniques can enhance the radio link reliability and increase the system capacity through diversity gain and multiple signal stream transmission.

Beamforming MIMO communication techniques can further improve the downlink throughput and reliability from an AP to a CS, but beamforming requires downlink channel state information (CSI). Obtaining CSI through channel reciprocity is useful in some situations because it does not require the overhead of a specific feedback signal from a CS. However, in order to obtain CSI through channel reciprocity, some MIMO wireless communication systems require the CS to send one or more sounding frames periodically on the uplink to the AP. Sounding frames introduce additional preamble overhead and not all CSs, especially lower cost CSs, are capable of transmitting such sounding frames. As a result, the AP cannot perform implicit beamforming of multiple signal streams to those CSs even though the AP is otherwise beamforming MIMO capable.

It would be desirable to configure an AP to derive the entire multidimensional channel information between it and a CS that is not capable of sending sounding frames. This will allow the AP to beamforming multiple streams to such lesser-capable CSs.

DESCRIPTION OF EXAMPLE EMBODIMENTS

Overview

Techniques are provided herein to estimate parameters of a wireless communication channel. At each of a first plurality of antennas of a first wireless communication device, a transmission is received that is associated with each of one or more spatial streams transmitted via a second plurality of antennas of a second wireless communication device. The transmission comprises at least first and second training fields which are configured for channel estimation. Multidimensional channel information between the first plurality of antennas and the second plurality of antennas is computed from receive values in the first and second training fields for one more dimension above a number of the spatial streams transmitted by the second wireless communication device and up to a lesser of a number of the first plurality of antennas and a number of the second plurality of antennas.

Figure 1:
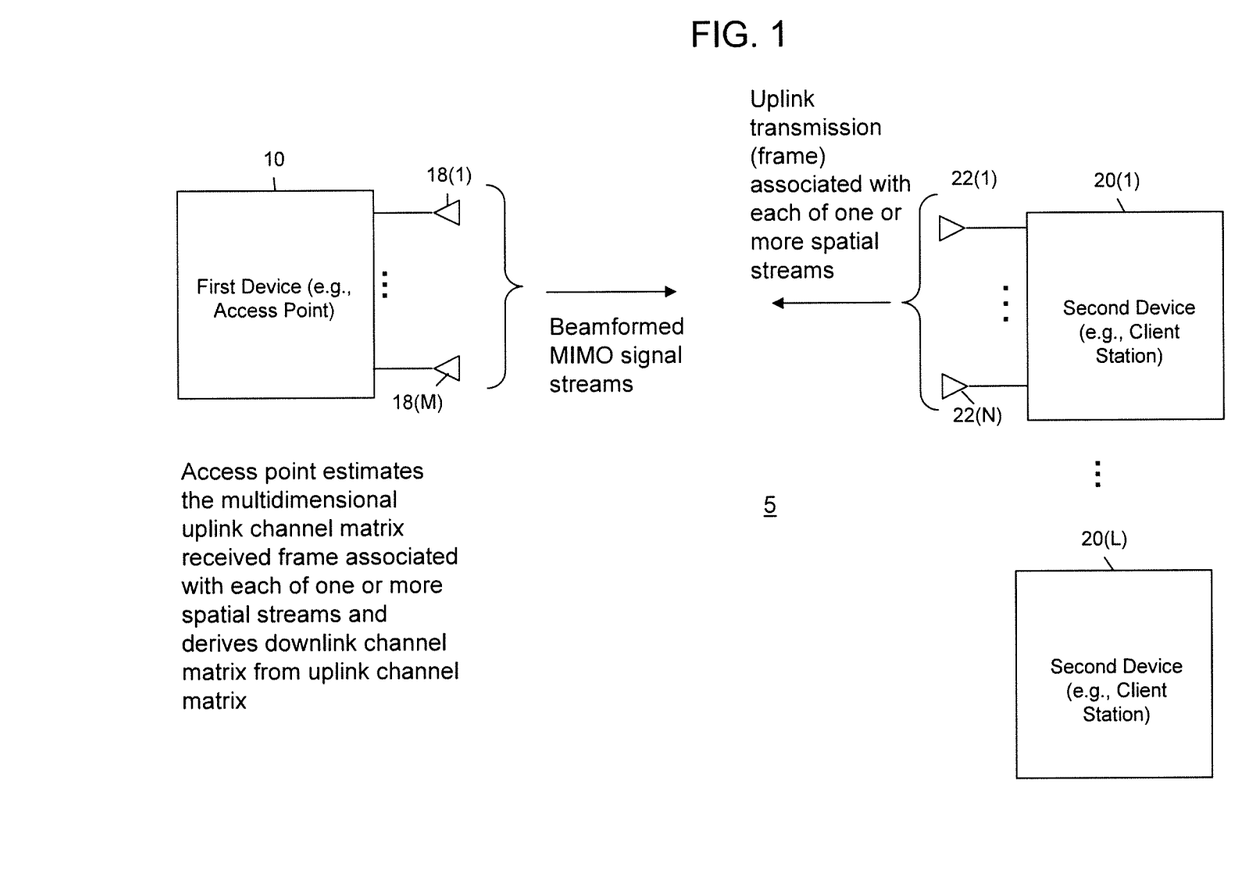
FIG. 1 is a block diagram that illustrates an example of a wireless communication system in which a first wireless communication device performs multidimensional channel estimation with respect to a second wireless communication device without the use of sounding signals.

Referring first to FIG. 1, an example of a wireless communication system 5 is shown that comprises a first wireless communication device 10 and a second wireless communication device 20. The first device 10 is, for example, an access point (AP) and the second device 20(1) is, for example, a client station (CS). The AP 10 may connect to wired data network facilities (not shown) and in that sense serves as a gateway through which a plurality of client stations have access to those data network facilities. For purposes of an example described herein, the AP 10 is communicating with CS 20(1) but the AP also may communicate with any one or more of the plurality of CSs 20(1)-20(L) shown in FIG. 1. Transmissions from the AP 10 to the CS 20(1) are referred to as downlink transmissions and transmissions from the CS 20(1) to the AP 10 are referred to as uplink transmissions.

The AP 10 comprises a plurality of antennas 12(1)-12(M) and the CS 20(1) comprises a plurality of antennas 22(1)-22(N). The AP 10 may wirelessly communicate with the CS 20(1) using a wireless communication protocol such as the IEEE 802.11n communication standard, also known commercially as WiFi™. In general, the techniques described herein are applicable to any communication standard that uses a "mixed mode" approach where information is sent to enable reception by legacy (older version) devices in addition to information that is provided to enable higher dimension channel estimates.

The AP 10 is configured to beamform multiple spatial signal streams on the downlink to the CSs, e.g., CS 20(1), using beamforming multiple-input multiple-output (MIMO) techniques. Some but not all of the CSs 20(1)-20(L) have a similar capability to beamform multiple spatial signal streams to the AP 10. In fact, for cost purposes, many CSs deployed in the system 5 may not have beamforming MIMO capability at all, or may be configured to operate in a single or reduced spatial stream uplink mode from time. The AP 10 is configured to estimate the multidimensional uplink channel from a received spatial stream uplink transmission frame transmitted by the CS 20(1), where the frame does not contain one or more sounding signals. This is achieved by exploiting a unique and unintended use of training fields in a spatial stream uplink transmission frame and a combining scheme of receive signal values in the training fields to estimate a full (multidimensional) uplink channel matrix from the received spatial stream uplink frame. The AP 10 then can derive the downlink channel matrix from the uplink channel matrix, and use the downlink channel matrix to compute the beamforming weight vectors used to beamforming MIMO signal streams to the CS 20(1).

Briefly, the multidimensional channel estimation technique described herein involves receiving at each of the plurality of antennas 12(1)-12(M) of the AP one or more transmissions that are transmitted via the plurality of antennas 22(1)-22(N) of the CS 20(1). The transmission comprises a frame that does not include one or more fields that contain sounding signals (values) specifically configured for multidimensional channel estimation, that is, the frame does not include one or more sounding signals. The AP 10 uses signals received at the plurality of antennas 12(1)-12(M) in the first and second training fields to compute multidimensional channel information between the antennas 12(1)-12(M) and the antennas 22(1)-22(M). Moreover, the multidimensional channel information so estimated is for one more dimension above a number of the spatial streams transmitted by the CS 20(1) and up to a lesser of a number of the AP antennas (M) and a number of the antennas at the CS 20(1) used for the transmission (N). Consequently, reliable multidimensional uplink channel information may be estimated without requiring the CS to transmit one or more sounding signals and thus extends the implicit beamforming capability of the AP 10 to non-cooperative (non-sounding signal capable) CSs.

Figure 2:
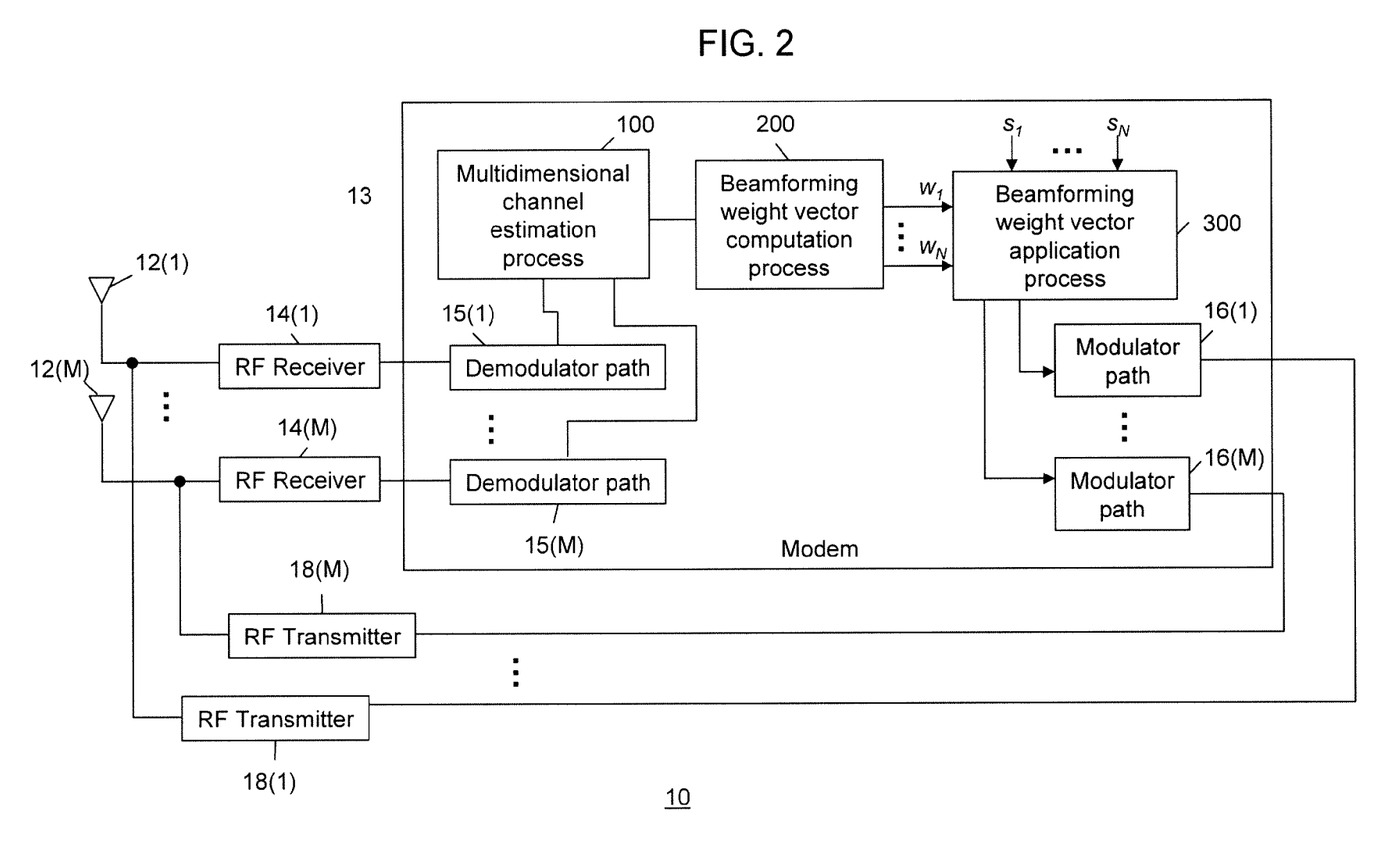
FIG. 2 illustrates an example of a block diagram of the first wireless communication device that is configured to perform a multidimensional channel estimation process without the use of sounding signals.

Turning to FIG. 2, an example of a block diagram of the AP 10 is now described. This block diagram is not intended to illustrate all of the components of the AP 10, but rather only those that are pertinent to the multidimensional channel estimation techniques described herein. The AP 10 comprises a plurality of radio frequency (RF) receivers 14(1)-14(M), one for each of the antennas 12(1)-12(M). The receivers 14(1)-14(M) may be separate receiver circuits that are in separate integrated circuits (ICs) or in a common IC. A modem 13 receives as input the outputs of the RF receivers 14(1)-14(M). It should be understood by those with ordinary skill in the art that analog-to-digital converters (ADCs) may reside between the outputs of the RF receivers 14(1)-14(M) and the modem 13, within the modem 13, or within the RF receivers. For simplicity, the ADCs are not shown in FIG. 2. The modem 13 is a section of the AP 10 that performs baseband demodulation of received signals and baseband modulation of transmit signals.

To this end, the modem 13 comprises demodulator paths 15(1)-15(M) that demodulate signals from the RF receivers 14(1)-14(M), respectively. Similarly, the modem 13 comprises a plurality of modulator paths 16(1)-16(M) that modulate transmit signals for transmission. The outputs of the modulator paths 16(1)-16(M) are coupled out of the modem 13 to respective ones of RF transmitters 18(1)-18(M). The RF transmitters 18(1)-18(M) are in turn coupled to antennas 12(1)-12(M), respectively. Digital-to-analog converters (DACs) may be provided between the digital outputs of the modulators 16(1)-16(M) and the analog inputs to the RF transmitters 18(1)-18(M). For simplicity, the DACs are not shown in FIG. 2.

The functions of the modem 13 may be implemented by logic encoded in one or more tangible media, e.g., embedded logic, such as an application specific integrated circuit, digital signal processor instructions, software that is executed by a processor, etc. The modem 13 may be implemented by logic in the form of processor instructions stored in a memory, which instructions are executed by a processor (computer processor, microprocessor, microcontroller, etc.) to carry out the functions described herein. Thus, the processes 100, 200 and 300 shown in FIG. 2 and described below may be implemented with fixed logic or programmable logic (e.g., software/computer instructions executed by a processor). Moreover, some of the modem functions may be implemented by a separate controller/processor component.

The modem 13 comprises logic to perform a multidimensional channel estimation process 100 using information obtained from each of the demodulator paths 15(1)-15(M). As mentioned above and described in more detail hereinafter, the process 100 estimates an uplink channel matrix. There are many uses of channel information that the process 100 computes. For example, a downlink channel matrix may be derived from the uplink channel matrix. A beamforming weight vector computation process 200, also in the modem 13, may use the downlink channel matrix to compute beamforming weight vectors $w_1$-$w_N$, each of dimension M. A beamforming weight vector application process 300 in the modem applies the beamforming weight vectors $w_1$-$w_N$ to distribute respective signal streams $s_1$-$s_N$ among the plurality of modulator paths 16(1)-16(M) for simultaneous beamformed MIMO transmission via antennas 12(1)-12(M).

Figure 3:
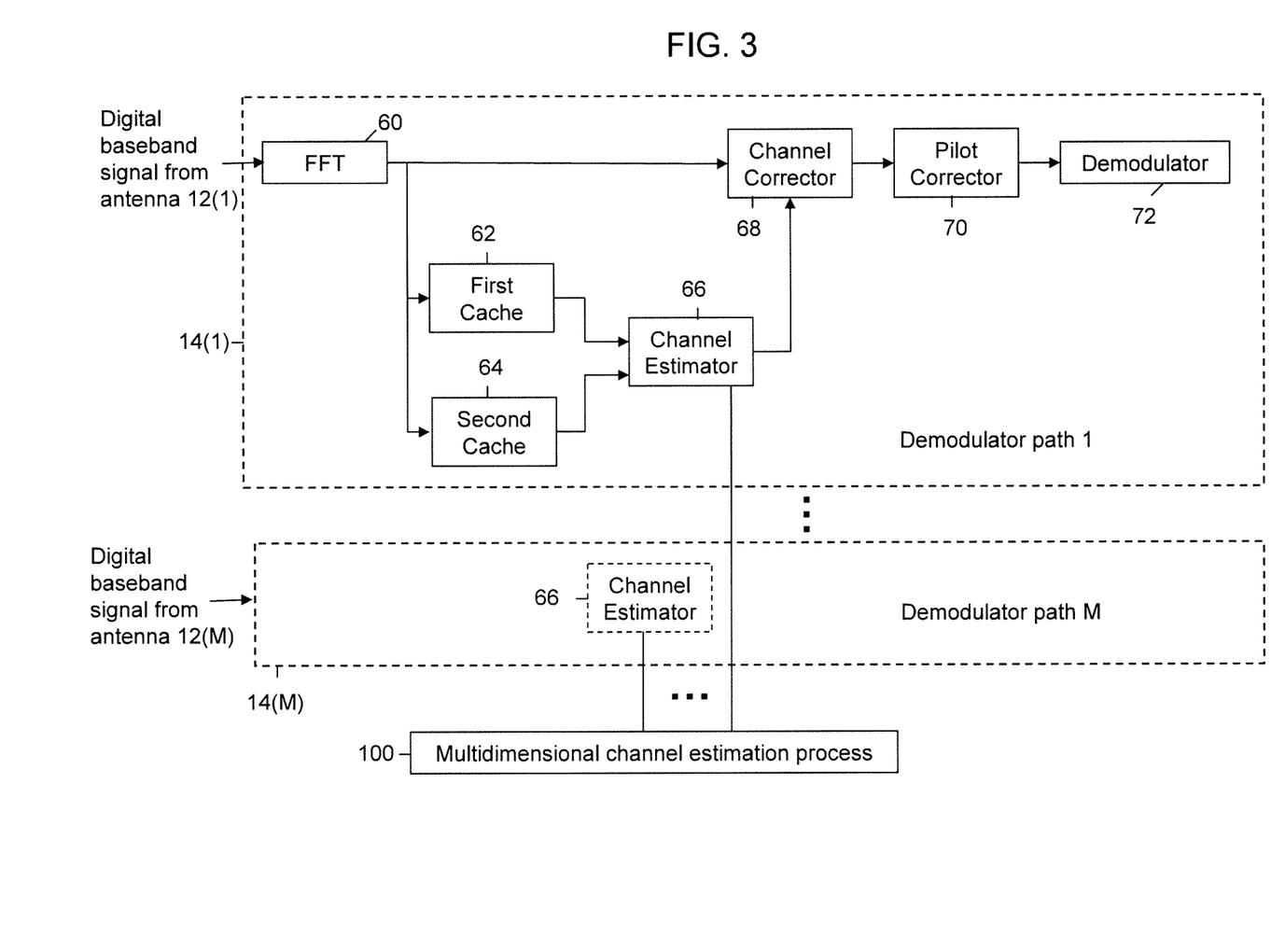
FIG. 3 is a more detailed block diagram that illustrates demodulator paths in the first wireless communication device that produce information used in the multidimensional channel estimation process.

Referring now to FIG. 3, details of pertinent components/functions (but not all) of the demodulator paths 14(1)-14(M) are shown. Details of pertinent components in the demodulator path 14(1) are shown in FIG. 3 as an example. The input to each demodulator path is a digital baseband receive signal derived from the signal received at a corresponding one of the antennas 12(1)-12(M). A Fast Fourier Transform (FFT) block 60 computes FFT values at a plurality of FFT bins in the digital baseband (antenna-specific) signal. A first cache 62 and a second cache 64 are coupled to the FFT block 60 and store values from the first and second training fields, respectively, contained in the digital baseband receive signal from a received transmission at the corresponding AP antenna. The first and second training fields are described in further detail hereinafter in conjunction with FIG. 3. A channel estimator block 66 is coupled to the first and second caches 62 and 64 and analyzes values at various frequency subcarriers in the first and second training fields to compute channel correction information. This channel correction information is supplied to a channel corrector block 68 that corrects the output of the FFT block 60. A pilot corrector block 70 is then coupled to the output of the channel corrector block to track the carrier frequency offset, phase noise and symbol timing errors. The demodulator block 72 is coupled to the output of the pilot corrector block 70 and demodulates the processed digital baseband signal in order to recover the data contained in the modulated signal. As shown in FIG. 3, the multidimensional channel estimation process 100 takes information from the channel estimator blocks 66 in each of the demodulator paths 14(1)-14(M) in order to compute the full multidimensional uplink channel from a single frame received at each of the plurality of antennas of the AP 10.

Figure 4:
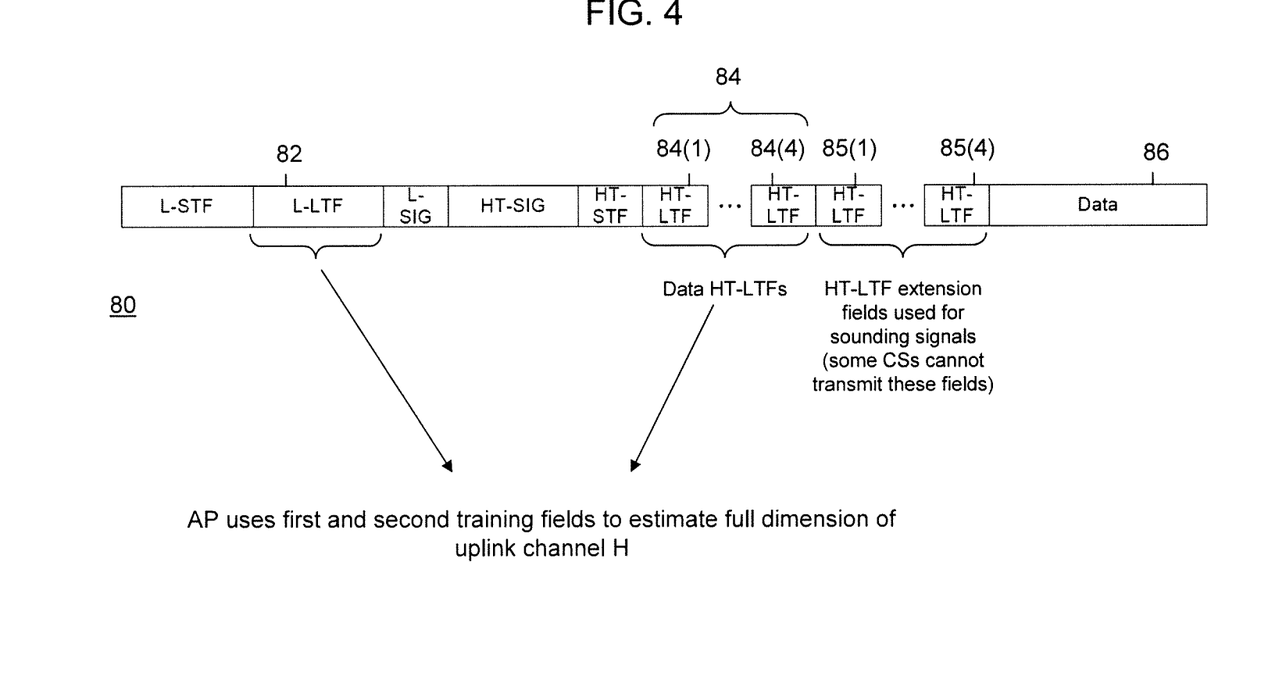
FIG. 4 is a timing diagram that illustrates fields of a frame that is sent from a plurality of antennas of the second wireless communication device to the first wireless communication device, and from which the first wireless communication device derives the multidimensional channel information.

Turning to FIG. 4, an example of a timing structure of a frame 80 that the CS 20(1) transmits to the AP 10 is shown. The frame 80 is an example of a mixed mode frame as defined in the IEEE 802.11n standard, and there are two different training fields in this frame. A first training field 82, called the legacy long training field (L-LTF), is provided that comprises a preamble pattern on a plurality of frequency subcarriers of an orthogonal frequency division multiplexed (OFDM) signal. The first training field is called a "legacy" training field because it allows for operation with so-called legacy devices that are not capable of performing higher data rate (high throughput) functions. On the other hand, there is a second training field 84, called the high throughput long training field (HT-LTF). The HT-LTF has one or two parts. The first part consists of one to four fields shown at 84(1)-84(4) that are provided for demodulation of the HT-Data field 86 of the frame 80. These HT-LTFs are referred to as Data HT-LTFs. The HT-LTFs 84(1)-84(4) can provide full dimensional channel estimation if the number of spatial signal streams transmitted by the CS 20(1) equals the number of transmit antennas, e.g., N in the example described herein. In cases when the CS transmits less spatial streams than the number of transmit antennas (N), the Data HT-LTF alone is not enough for full dimensional channel estimation.

The optional second part of the HT-LTF comprises zero to four fields shown at 85(1)-85(4), referred to as extension fields, which are provided to probe extra spatial dimensions of the MIMO channel that are not utilized by the HT-Data field 86 of the frame 80. These extension fields serve as so-called "sounding frames" for CSs that are capable of transmitting them. However, some CSs are not capable of generating and transmitting the sounding frames, but it may nevertheless be desirable to gain knowledge of the multidimensional channel matrix in order to for the AP 10 to transmit (beamform) multiple spatial streams to these CSs.

Figure 5:
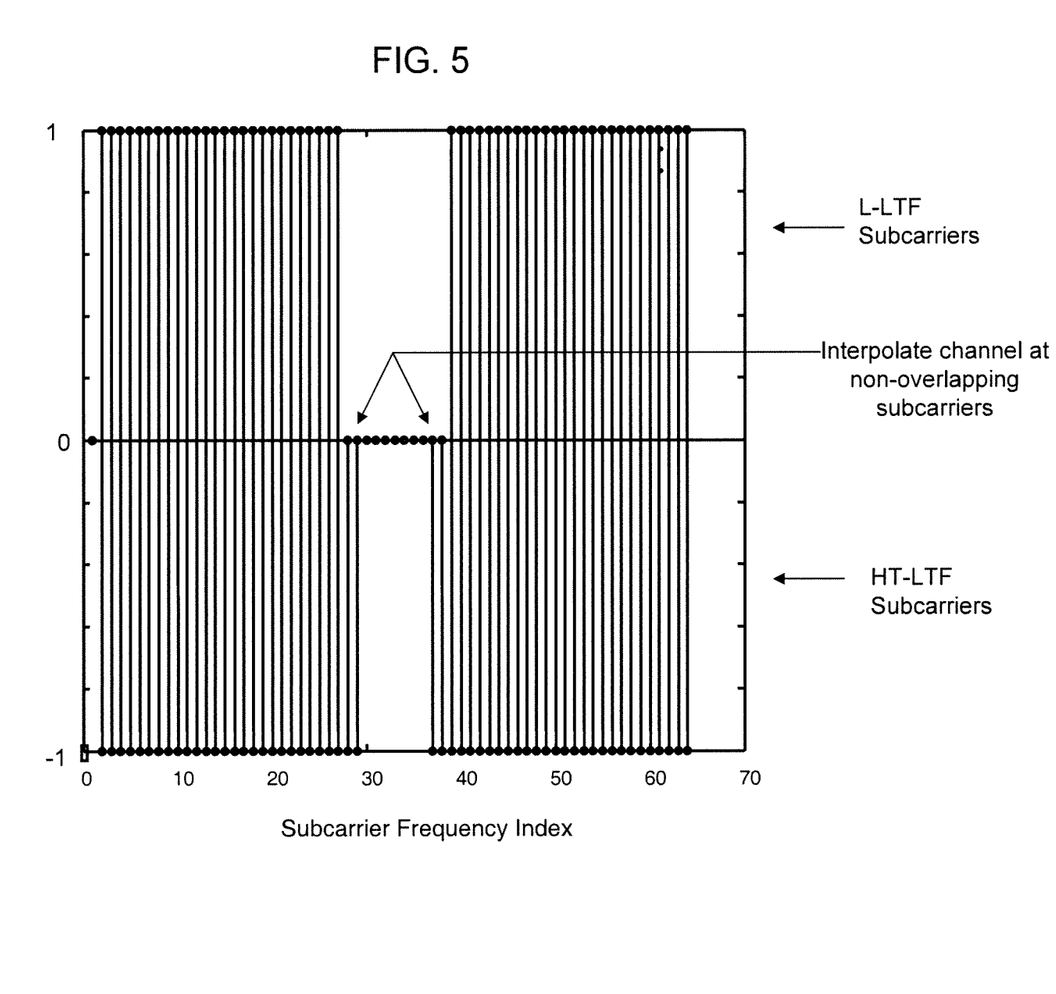
FIG. 5 is a plot showing the frequency subcarrier allocations for examples of first and second training fields from which the multidimensional channel information is derived.

With reference to FIG. 5, the training fields 82 and 84(1)-84(4) comprise signal patterns that are known, a priori, to both devices on a communication link. For example, the first training field 82 uses a plurality of frequency subcarriers that are filed with a+1 and the second training fields 84(1)-84(4) uses a plurality of frequency subcarriers that are filled with a−1. The first and second training fields need not use all of the same frequency subcarriers. Where the subcarriers used in the first and second training fields do not overlap, interpolation may be employed to derive the channel information at other subcarriers, as indicated in FIG. 5 and described hereinafter.

The multidimensional channel estimation process 100 derives the multidimensional channel information from a spatial stream (mixed mode) frame that does not contain values in the sounding frame extension fields 85(1)-85(4). This is achieved by a unique (unintended) use of the legacy preamble information in the L-LTF 82 in a combining scheme with the HT-LTF preamble information in the Data HT-LTFs 84(1)-84(4) to estimate the full (multidimensional) uplink channel matrix from the single spatial stream uplink frame. In general, the techniques described herein are useful to estimate one more dimension of the channel above the number (nSts) of the spatial streams transmitted by the CS 20(1) and up to a lesser of the number (M) of antennas at the AP 10 and the number (N) of antennas at the CS 20(1). For example, when the CS 20(1) has two antennas and transmits a single spatial stream uplink frame, the AP 10 can estimate the full 2×2 channel to the CS 20(1). Furthermore, when the CS 20(1) has three antennas and the AP 10 has three antennas and the CS 20(1) transmits a single spatial stream, the AP 10 can estimate a 2×2 channel to the CS 20(1), and if the CS 20(1) transmits two spatial streams, the AP 10 can estimate the full 3×3 channel to the CS 20(1). However, these are only examples and are not intended to limit the scope of the techniques described herein.

Figure 6:
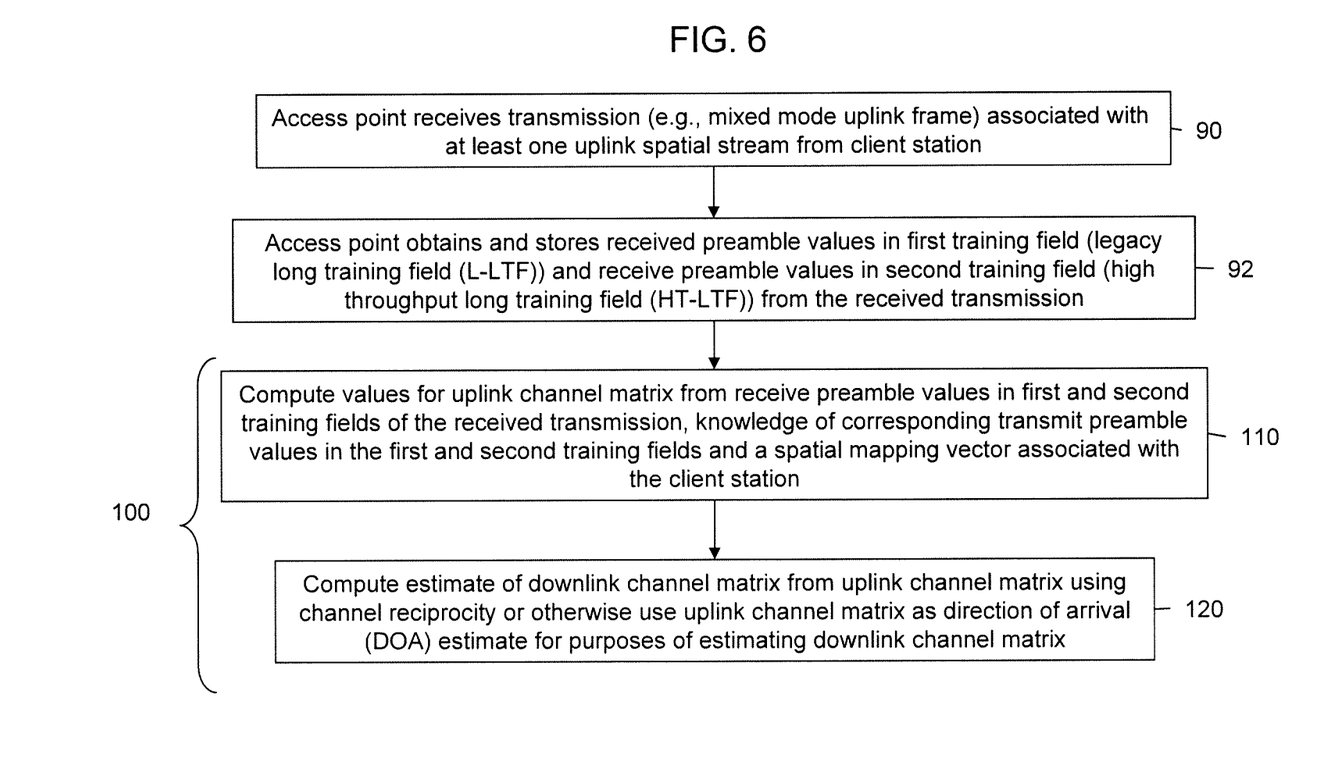
FIG. 6 is an example of a flowchart of the multidimensional channel estimation process.

The multidimensional channel estimation process 100 is now described in further detail with reference to the flowchart of FIG. 6 and continued reference to FIGS. 3-5. Prior to execution of the process 100, at 90, the AP 10 receives a transmission (e.g., mixed mode uplink frame) associated with at least one uplink spatial stream via a plurality of antennas of a CS, e.g., CS 20(1). As explained above, the AP 10 could receive a transmission (frame) associated with each of multiple uplink spatial streams sent by the CS 20(1) and the functions described herein are performed with respect to the received transmission (frame) for each uplink spatial stream. At 92, the AP 10 stores in the first cache 62 and second cache 64 receive preamble values (after FFT processing) contained in the first training field (L-LTF) and in the second training field (Data HT-LTF(s)), respectively, from the received transmission.

The process 100 then begins at 110 where, through information produced by the channel estimator blocks 66 in the demodulator paths 14(1)-14(M) of the AP 10, values are computed for an uplink channel matrix from receive preamble values in the first and second training fields, the corresponding transmit preamble values (based on a priori knowledge of the preamble patterns used in the training fields) in the first and second training fields, and a spatial mapping vector associated with the CS, e.g., CS 20(1), that sent the transmission to the AP 10. The computation made at 110 involves computing values for the uplink channel matrix at a plurality of subcarriers based on receive preamble values at the plurality of subcarriers and transmit preamble values at the plurality of subcarriers in each of the first and second training fields. In the event that there are subcarriers that are not used in both the first and second training fields, values for the uplink channel matrix at additional subcarriers may be computed by interpolation with respect to the values for the uplink channel matrix at the plurality of subcarriers which are used in both training fields. Furthermore, as described below, depending on the number of spatial streams, the number of antennas of the AP 10 and the number of antennas of the CS 20(1), the computation at 110 may involve computing an inverse of a square matrix or a pseudo-inverse of a non-square matrix.

At 120, the downlink channel matrix may be computed as the transpose of the uplink channel matrix, $H^T$, when the downlink channel is reciprocal to the uplink channel. Without a calibration process such as described in the 802.11n standard, reciprocity of the channel is not exact. In this case the uplink channel estimate differs from the downlink channel by the inclusion of the AP receiver channel and the client transmitter channel. In many cases these channel differences are negligible for the purpose of determining a set of downlink beamforming weights that will enhance the downlink wireless link. Otherwise, the uplink channel matrix may be used as an estimate of the direction of arrival (DOA) of the CS 20(1) for purposes of estimating the downlink channel matrix.

The computations at 110 are now described in further detail. For purposes of the following description, the CS has two antennas (common for an IEEE 802.11n CS due to size and power consumption constraints) and the AP 10 has knowledge of the antenna mapping vector q of the CS. In most cases, the antenna mapping vector q is constant over all data and pilot subcarriers and does not change from frame to frame. Consequently, the AP 10 can request the CS to inform it about the vector q or the AP 10 can derive or guess what it is over multiple received frames. The mapping vector q maps one or more streams to the CS's antennas when the CS transmits an uplink frame via the CS's multiple antennas to the AP 10.

At each subcarrier (data or pilot) in the L-LTF, a set of equations is derived of the form:

$$r_1 = H*c*s_1 + n_1 \quad (1)$$

where $r_1$ is a receive preamble vector representing receive values in the L-LTF across all of the antennas of the AP, $s_1$ is the transmit preamble representing the transmit preamble values in the L-LTF (which is the same for all of the AP antennas), c is the cyclic shift diversity (CSD) vector, H is the uplink channel matrix and $n_1$ is the noise vector, and where values for c and $s_1$ are known to AP and values for $r_1$ are determined from receive signals at each of the antennas of the AP.

The L-LTF includes two identical preamble symbols. As a result, a set of equations following the form of equation (1) may be obtained for each preamble symbol at each subcarrier, with the only difference between the two sets of equations for the respective preamble symbols of the L-LTF being the noise vector $n_1$. These two sets of equations may be averaged to reduce the noise variance by ½ and thereby provide a better channel estimate. That is, average receive preamble values associated with respective ones of multiple identical transmit preamble values contained in the L-LTF are computed and used in equation (1) at each subcarrier.

Similarly, at each subcarrier (data or pilot) in the HT-LTF, a set of equations is obtained of the form:

$$r_2 = H^* q^* s_2 + n_2 \qquad (2)$$

where $r_2$ is the receive preamble vector representing receive values in the HT-LTF across all of the antennas of the AP, $s_2$ is the transmit preamble vector representing the transmit preamble values in the HT-LTF (which are the same for all of the AP antennas) and q is the antenna mapping vector of the CS. The transmit preamble vector $s_2$ and the antenna mapping vector q are known to the AP 10 and the receive preamble vector $r_2$ is determined from signals received at each of the antennas of the AP 10.

The data for equations (1) and (2) are derived from output of the channel estimators 66 in each of the demodulator paths 14(1)-14(M) shown in FIG. 3.

Combining equations (1) and (2) provides a system of 2×M equations, where M is the number of antennas at the AP 10. Excluding the noise vector $n_1$ and $n_2$, there are 2×M unknowns (in the uplink channel matrix H), and assuming that this system of equations is linearly independent, all of the 2×M unknowns can be solved.

Specifically, rewriting the combination of equations (1) and (2) provides:

$$R = HS + N, \qquad (3)$$

where R is a {M, 2} matrix of the receive preamble values, H is a {M, 2} matrix, S is a {2,2} matrix of the transmit preamble values and N is a {M,2} matrix. So if S is invertible, the uplink channel matrix H can be estimated using zero forcing techniques such that $H = R^* \text{inv}(S) = R^*(S^{-1})$. Also, in this example, the CS has two antennas.

In equations (1) and (2) scaling factors are omitted for simplifying the description herein. These scaling factors are known to AP and their existence does not affect the solution.

In the case where S is a non-square matrix, due to the number of spatial streams, number of antennas at the AP 10 and number of antennas at the CS 20(1), then a straight matrix inversion computation of the matrix S may not be possible. For example, if the CS 20(1) has three antennas, the AP 10 has two antennas, and the CS 20(1) transmits one spatial stream, the S matrix would be a 3×2 matrix. In this case, a pseudo-inverse computation may be made in order to compute the uplink channel matrix H, such as $H = R^* S^H (SS^H)^{-1}$, where H denotes the conjugate transpose operation.

The following is a further example of the computations made at 110 and 120 of the process 100 in the case where the AP 10 has two antennas and the CS 20(1) also has two antennas. The CS 20(1) transmits a single spatial stream frame to the AP 10 via its two antennas according to a mapping vector q.

Assuming the training symbol sent on the uplink at subcarrier k of L-LTF is +1, the resulting first set of equations, in matrix form, are:

$$\begin{bmatrix} r_0 \\ r_1 \end{bmatrix} = \begin{bmatrix} h_{00} & h_{01} \\ h_{10} & h_{11} \end{bmatrix} \begin{bmatrix} 1 \\ e^{-j\theta_{csd}} \end{bmatrix} + \begin{bmatrix} n_0 \\ n_1 \end{bmatrix},$$

where $e^{-j\theta}$ is a phase rotation factor determined by the CSD), $r_0$ is the receive preamble value from the L-LTF, $n_0$ is the noise at one AP antenna, $r_1$ is the receive preamble value from the L-LTF and $n_1$ is noise at the other AP antenna.

Assuming the training symbol sent on the uplink at subcarrier k of HT-LTF is also +1, the resulting second set of equations, in matrix form, are:

$$\begin{bmatrix} r_2 \\ r_3 \end{bmatrix} = \begin{bmatrix} h_{00} & h_{01} \\ h_{10} & h_{11} \end{bmatrix} \begin{bmatrix} q_0 \\ q_1 \end{bmatrix} + \begin{bmatrix} n_2 \\ n_3 \end{bmatrix},$$

where $$q = \begin{bmatrix} q_0 \\ q_1 \end{bmatrix}$$

is the mapping vector, $r_2$ is the receive preamble value from the HT-LTF, $n_2$ is the noise at one AP antenna, $r_3$ is the receive preamble value from the HT-LTF and $n_3$ is the noise at the other AP antenna.

Assuming that the mapping vector q is known at AP 10, there are four equations with four unknowns. When the matrix $$\begin{bmatrix} 1 & q_0 \\ e^{-j\theta_{csd}} & q_1 \end{bmatrix}$$

is invertible, (which is the case in most scenarios because $\theta_{csd}$ is an angle specific to each subcarrier), the uplink channel matrix can be estimated by the computation:

$$H = \begin{bmatrix} r_0 & r_2 \\ r_1 & r_3 \end{bmatrix} \cdot \begin{bmatrix} 1 & q_0 \\ e^{-j\theta_{csd}} & q_1 \end{bmatrix}^{-1}.$$

The channel estimation techniques described herein allow for estimation of a multidimensional channel (between multiple antennas of first and second devices) by a unique and unintended use of the preamble information contained in a transmission. This approach can obtain reliable uplink channel information without requiring the inclusion of sounding signals in a frame, which is desirable for a common device configuration (2-antenna client station) and in general useful for any configuration it is desirable to compute multidimensional channel information between antennas of first and second wireless communication devices for one more dimension above a number of the spatial streams transmitted by the second wireless communication device and up to a lesser of a number of a first plurality of antennas of the first communication device and a number of a second plurality of antennas of the second communication device.

There are many applications of the multidimensional channel estimation techniques described herein. One such application is to enable multiple spatial stream downlink beamforming by deriving the downlink channel parameters from at least one received spatial stream mixed mode uplink frame. This extends implicit beamforming capabilities to non-cooperative client station, those client stations that are not capable of transmitting sounding signals.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
   at each of a first plurality of antennas of a first wireless communication device, receiving a transmission associated with each of one or more spatial streams that are transmitted via a second plurality of antennas of a second wireless communication device, wherein the transmission comprises at least first and second training fields which are configured for channel estimation; and
   computing multidimensional channel matrix information between the first plurality of antennas and the second plurality of antennas from receive values in the first and second training fields, a spatial mapping vector, and a cyclic diversity vector, wherein computing the multidimensional channel matrix information comprises calculating the multidimensional channel matrix information having a dimension one above a number of the spatial streams transmitted by the second wireless communication device and less than or equal to a number of the first plurality of antennas and a number of the second plurality of antennas.

2. The method of claim 1, wherein computing the multidimensional channel matrix information from the spatial mapping vector comprises computing the multidimensional channel matrix information from the spatial mapping vector indicating how the transmission of a spatial stream is mapped by the second wireless communication device to the second plurality of antennas.

3. The method of claim 2, wherein computing comprises computing an uplink channel matrix representing the multidimensional channel matrix information, and computing a downlink channel matrix from the uplink channel matrix.

4. The method of claim 3, and further comprising computing a plurality of beamforming weight vectors from the downlink channel matrix, wherein the plurality of beamforming weight vectors are for applying to multiple signal streams to be transmitted via the first plurality of antennas of the first wireless communication device to the second plurality of antennas of the second wireless communication device.

5. The method of claim 3, and further comprising obtaining receive values in the first and second training fields of the received transmission, wherein the second training field comprises a training field according to a wireless communication standard, and the first training field comprises a training field according to an older version of the wireless communication standard.

6. The method of claim 3, wherein computing comprises computing values for the uplink channel matrix at a plurality of subcarriers based on preamble values at the plurality of subcarriers and transmit values at the plurality of subcarriers in each of the first and second training fields.

7. The method of claim 6, wherein computing comprises computing values for the uplink channel matrix at the plurality of subcarriers and at additional subcarriers by interpolation with respect to the values for the uplink channel matrix at the plurality of subcarriers.

8. The method of claim 3, wherein computing the downlink channel matrix comprises computing a transpose of the uplink channel matrix.

9. The method of claim 3, and further comprising computing average receive values for the first training field from multiple receive values associated with respective ones of multiple identical transmit values contained in the first field.

10. The method of claim 1, wherein receiving comprises receiving the frame that is formatted according to the IEEE 802.11n standard, and wherein the first training field is a legacy long training field and the second training field is a high throughput long training field.

11. The method of claim 10, wherein receiving comprises receiving a spatial stream mixed mode frame that does not contain data in sounding frame extension fields, and the second training field comprises preamble information in the high throughput long training field.

12. The method of claim 1, and further comprising sending from the first wireless communication device to the second wireless communication device a request for the second wireless communication device to inform the first wireless communication device about the spatial mapping vector.

13. The method of claim 1, and further comprising the first wireless communication device deriving the spatial mapping vector over multiple transmissions received from the second wireless communication device.

14. The method of claim 1, wherein the second plurality of antennas has a greater number of antennas than the first plurality of antennas.

15. An apparatus comprising:
   a first plurality of antennas;
   a receiver coupled to the first plurality of antennas and configured to produce individual receive signals from signals received by respective ones of the first plurality of antennas; and
   a modem coupled to the receiver, wherein the modem is configured to:
      for a transmission associated with each of one or more spatial streams transmitted via a second plurality of antennas of another apparatus and received at each of the first plurality of antennas, obtain receive values in a first and second training field, and
      compute multidimensional channel matrix information between the first plurality of antennas and the second plurality of antennas from the receive values in the first and second training fields, a spatial mapping vector, and a cyclic diversity vector, the multidimensional channel matrix information having a dimension above a number of the spatial streams transmitted by the other apparatus and less than or equal to a number of the first plurality of antennas and a number of the second plurality of antennas.

16. The apparatus of claim 15, wherein the modem is configured to compute an uplink channel matrix representing the multidimensional channel matrix information.

17. The apparatus of claim 16, wherein the modem is configured to obtain the second training field comprising a training field according to a wireless communication standard, and obtain the first training field comprising a training field according to an older version of the wireless communication standard, and
   wherein the modem is configured to compute the multidimensional channel matrix information from the spatial mapping vector indicating how the transmission of a spatial stream is mapped by the other apparatus to the second plurality of antennas when transmitted by the other apparatus.

18. The apparatus of claim 17, wherein the modem is configured to compute values for the uplink channel matrix at a plurality of subcarriers based on receive values at the plurality of subcarriers and transmit values at the plurality of subcarriers in each of the first and second training fields.

19. The apparatus of claim 18, wherein the modem is configured to compute values for the uplink channel matrix at the plurality of subcarriers and at additional subcarriers by interpolation with respect to the values for the uplink channel matrix at the plurality of subcarriers.

20. The apparatus of claim 16, wherein the modem is configured to compute a downlink channel matrix by computing a transpose of the uplink channel matrix.

21. The apparatus of claim 15, wherein the apparatus is further configured to send the other apparatus a request that the other apparatus inform the first wireless communication device about the spatial mapping vector.

22. One or more non-transitory tangible processor readable storage media that stores instructions for execution by a processor and when executed operable to: obtain receive values in first and second training of a transmission associated with each of one or more spatial streams transmitted via a second plurality of antennas of a second wireless communication device and received at a first plurality of antennas of a first wireless communication device, and
   compute multidimensional channel matrix information between the first plurality of antennas and the second plurality of antennas from the receive values in the first and second training fields, a spatial mapping vector, and a cyclic diversity vector, the multidimensional channel matrix information having a dimension above a number of the spatial streams transmitted by the other second wireless communication device and less than or equal to of a number of the first plurality of antennas and a number of the second plurality of antennas.

23. The non-transitory tangible processor readable storage media of claim 22, wherein the instructions that are operable to compute the multidimensional channel matrix information comprise instructions operable to compute values for an uplink channel matrix based on the spatial mapping vector, wherein the spatial mapping vector indicates how the transmission of a spatial stream is mapped by the second wireless communication device to the second plurality of antennas when transmitted by the second wireless communication device.

24. The non-transitory tangible processor readable storage media of claim 23, wherein the instructions operable to compute the multidimensional channel matrix information comprises instructions operable to compute values for the uplink channel matrix at a plurality of subcarriers based on receive values at the plurality of subcarriers and transmit values at the plurality of subcarriers in each of the first and second training fields.

25. The non-transitory tangible processor readable storage media of claim 24, wherein the instructions operable to compute the multidimensional channel information comprises instructions operable to compute values for the uplink channel matrix at the plurality of subcarriers and at additional subcarriers by interpolation with respect to the values for the uplink channel matrix at the plurality of subcarriers.

26. The non-transitory tangible processor readable storage media of claim 22, and further comprising instructions operable to compute to compute a downlink channel matrix from the uplink channel matrix.

27. The non-transitory tangible processor readable storage media of claim 26, and further comprising instructions operable to compute to compute a plurality of beamforming weight vectors from the downlink channel matrix, wherein the plurality of beamforming weight vectors are for applying to multiple signal streams to be transmitted via the first plurality of antennas of the first wireless communication device to the second plurality of antennas of the second wireless communication device.

28. The non-transitory tangible processor readable storage media of claim 22, and further comprising instructions operable to cause the first wireless communication device to send to the second wireless communication device a request that the second wireless communication device inform the first wireless communication device about the spatial mapping vector.

\* \* \* \* \*